US010275737B2

(12) United States Patent
Chen et al.

(10) Patent No.: US 10,275,737 B2
(45) Date of Patent: Apr. 30, 2019

(54) ENABLING AND DISABLING USER DEVICE CONFIGURATIONS BASED ON AN ACCOUNT TYPE OF THE USER DEVICE

(71) Applicant: Verizon Patent and Licensing Inc., Arlington, VA (US)

(72) Inventors: Zhengfang Chen, Millburn, NJ (US); Masudur Rahman, Somerset, NJ (US); Farook Kaleem, Edison, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 495 days.

(21) Appl. No.: 14/968,046

(22) Filed: Dec. 14, 2015

(65) Prior Publication Data
US 2017/0169429 A1 Jun. 15, 2017

(51) Int. Cl.
*G06Q 10/00* (2012.01)
*G06Q 10/08* (2012.01)
*H04L 29/08* (2006.01)
*G06Q 20/22* (2012.01)
*G06Q 20/32* (2012.01)
*H04W 4/50* (2018.01)

(52) U.S. Cl.
CPC ......... *G06Q 10/087* (2013.01); *G06Q 20/227* (2013.01); *G06Q 20/32* (2013.01); *H04L 67/30* (2013.01); *H04L 67/306* (2013.01); *H04W 4/50* (2018.02)

(58) Field of Classification Search
CPC ............. G06Q 20/409; G06Q 20/4093; G06Q 20/4097

USPC .......................................................... 705/44
See application file for complete search history.

(56) References Cited

U.S. PATENT DOCUMENTS 8,875,095 B2 * 10/2014 Hirsch ...................... G06F 8/20
717/107
2007/0127426 A1 * 6/2007 Watters ................. H04L 67/125
370/338
(Continued)

OTHER PUBLICATIONS

"Mori Giulio, Paterno Fabio, Santoro Carmen", Design and Development of Multidevice User Interfaces through Multiple Logical Descriptions:, Aug. 2004, IEEE Transactions on Software Engineering, vol. 30 No. 8, pp. 507-520 (Year: 2004).*
(Continued)

*Primary Examiner* — Eric T Wong
*Assistant Examiner* — Kevin T Poe

(57) ABSTRACT

A user device may request an account type identifier that identifies an account type associated with the user device. The user device may receive the account type identifier based on requesting the account type identifier. The user device may compare the account type identifier and a set of account type identifiers corresponding to a set of user device configurations to be enabled or disabled by the user device based on the account type identifier. The user device may enable a first subset of user device configurations, included in the set of user device configurations that are associated with the account type identifier. The user device may disable a second subset of user device configurations, included in the set of user device configurations that are not associated with the account type identifier.

20 Claims, 4 Drawing Sheets

(56) References Cited

U.S. PATENT DOCUMENTS

| | | | | |
|---|---|---|---|---|
| 2013/0072153 | A1* | 3/2013 | Lawson | H04L 63/10 |
| | | | | 455/410 |
| 2013/0179833 | A1* | 7/2013 | Stallings | G06F 3/0482 |
| | | | | 715/810 |
| 2013/0231080 | A1 | 9/2013 | Cheuk et al. | |
| 2014/0045474 | A1 | 2/2014 | Cheuk et al. | |
| 2014/0109046 | A1* | 4/2014 | Hirsch | G06F 9/44 |
| | | | | 717/120 |
| 2014/0283142 | A1* | 9/2014 | Shepherd | G06F 3/0482 |
| | | | | 726/30 |
| 2016/0330151 | A1* | 11/2016 | Xiang | H04W 4/21 |

OTHER PUBLICATIONS

"Schmidt Dominik, Seifert Julian, Rukzio Enrico, Gellersen Hans", A Cross-Device Interfaction Style for Mobiles and Surfaces, Jun. 3, 2014, School of Computing and Communications, Lancaster University, UK (Year: 2014).*

Rekimoto Jun, Saitoh Masanori, Augmented Surfaces: A Spatially Continuous Work Space for Hybrid Computing Environments, 1999, Human Factors in Computing Systems (Year: 1999).*

3rd Generation Partnership Project, "3GPP TR 29.819 V0.2.0 (Nov. 2015): 3rd Generation Partnership Project; Technical Specification Group Core Network and Terminals; Study on Impacts of the Diameter Base Protocol Specification Update; (Release 13)," http://www.3gpp.org/ftp/Specs/latest-drafts/, Nov. 28, 2015, 17 pages.

Verizon Wireless, "LTE 3GPP Band 13 Device Requirements and Testing Announcements," https://opennetwork.verizonwireless.com/content/dam/open-development/files/LTE_3GPP_Band13_Device_Reqts.pdf, Aug. 27, 2015, 20 pages.

* cited by examiner

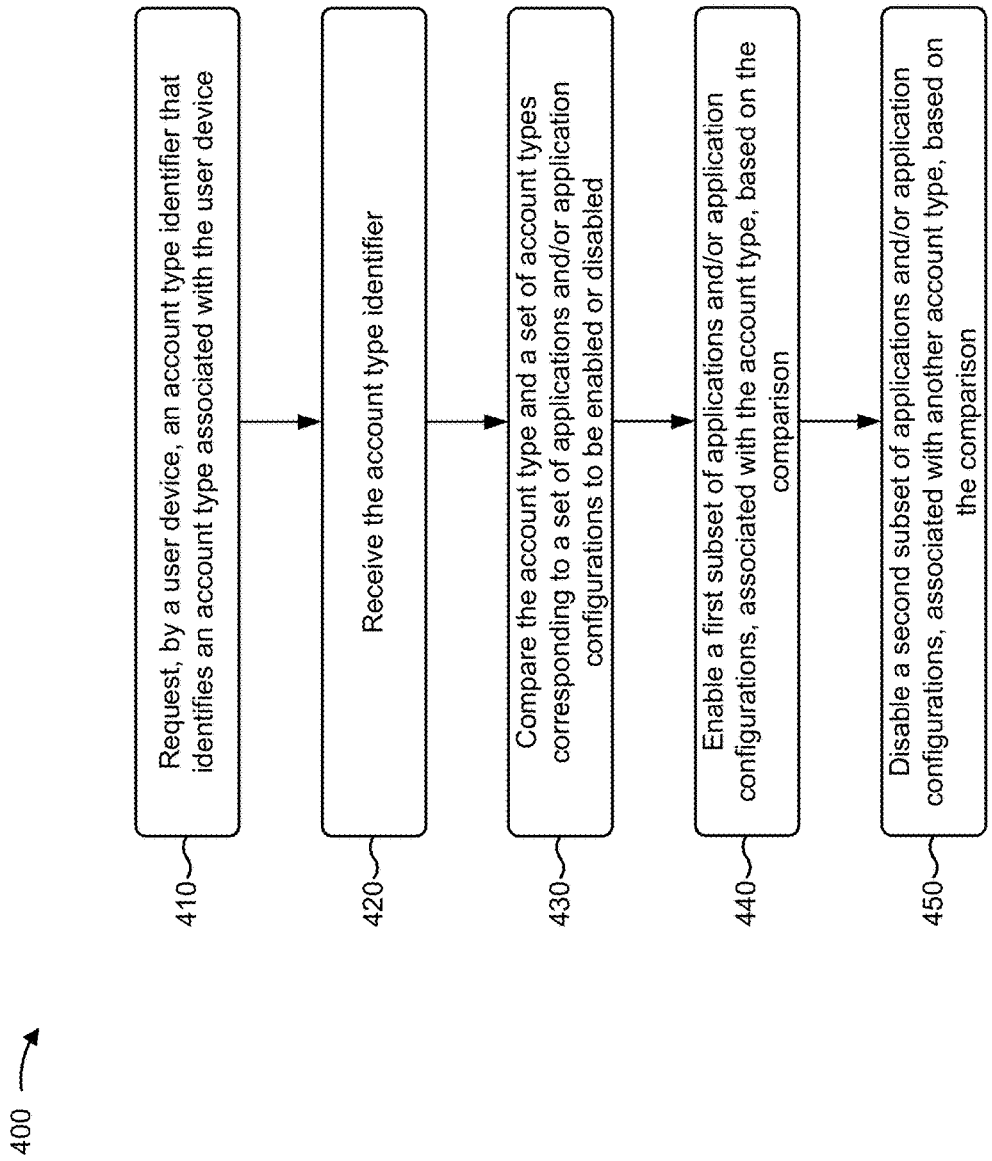

US 10,275,737 B2

ENABLING AND DISABLING USER DEVICE CONFIGURATIONS BASED ON AN ACCOUNT TYPE OF THE USER DEVICE

BACKGROUND

A user device may be configured with a set of applications and/or application configurations for the set of applications. The user device, or a user of the user device, may be associated with an account type, such as a pre-pay account type where the user pre-pays for services, a post-pay account type where the user contracts with a network operator for the services, a wholesale account type where the user pays for services indirectly through a third party, or another account type. In some cases, different account types may be associated with different services, such as different applications, different application configurations, or the like, which may be available via a website.

BRIEF DESCRIPTION OF THE DRAWINGS

FIG. 4 is a flow chart of an example process for enabling and disabling user device configurations based on an account type associated with the user device.

DETAILED DESCRIPTION OF PREFERRED EMBODIMENTS

The following detailed description of example implementations refers to the accompanying drawings. The same reference numbers in different drawings may identify the same or similar elements.

A user device may be configured with a set of applications (e.g., applications installed on the user device, executing on the user device, applications executed remotely by the user device, etc.) and/or application configurations (e.g., configurations for the applications), which may be referred to collectively as a user device configuration. A user of the user device may be associated with an account type, such as a pre-pay account type, a post-pay account type, a wholesale account type, or another account type. A user device associated with a first account type may be configured with a different set of applications and/or application configurations than a user device associated with a second account type. This may require development and testing of different user device configurations for different user devices associated with different account types, which may be time-consuming, costly, and resource-intensive. Furthermore, this may reduce user device compatibility because a user device may only be compatible with a single account type and a corresponding user device configuration (e.g., applications and/or application configurations).

Implementations described herein enable a user device to store multiple user device configurations associated with multiple account types, and to enable or disable different user device configurations (e.g., applications and/or application configurations) based on an account type associated with a user of the user device. Furthermore, implementations described herein enable a single stock keeping unit (SKU) of the user device to be associated with multiple user device configurations. In this way, the user device may have increased compatibility with multiple account types, may reduce or eliminate a need for multiple user device SKUs for multiple user device configurations, and may conserve computing resources that would otherwise be used to separately develop and test different user device configurations for different user devices.

Figure 1:
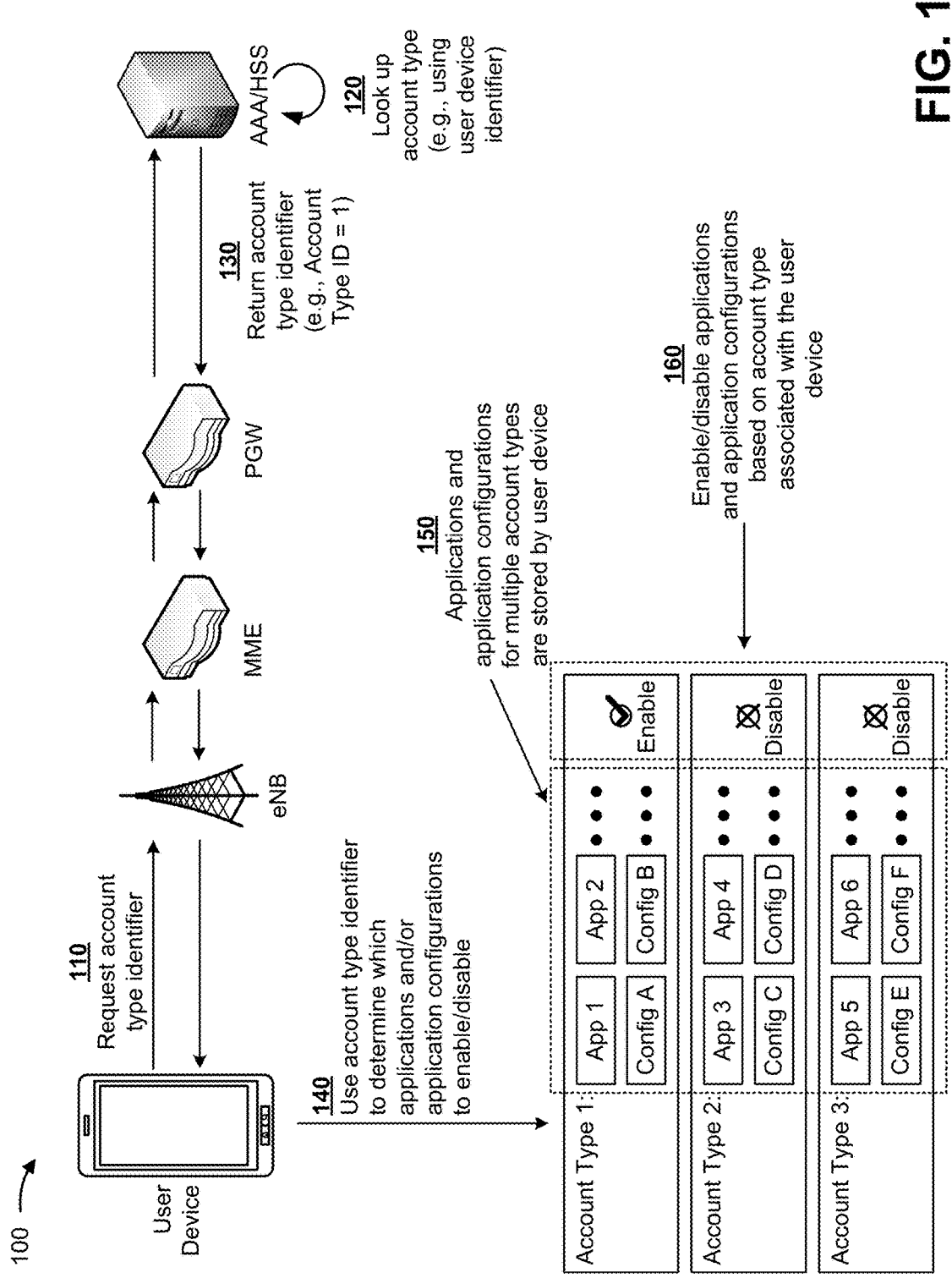
FIG. 1 is a diagram of an overview of an example implementation described herein.

FIG. 1 is a diagram of an overview of an example implementation 100 described herein. As shown in FIG. 1, and by reference number 110, a user device (e.g., a mobile phone) may send a request, via a base station (e.g., shown as an eNodeB (eNB), a mobility management entity device (MME), and a packet data network gateway (PGW), to an authentication, authorization, and accounting server (AAA) and/or a home subscriber server (HSS) (shown as AAA/HSS). One or more other network devices, not shown in FIG. 1, may be involved with sending the request from the user device to the AAA/HSS, as discussed below.

The request may include a request for an account type identifier that identifies an account type associated with the user device. As shown by reference number 120, based on the request, the AAA/HSS may identify the account type for the user device. For example, the AAA/HSS may use a user device identifier (e.g., a SIM ID, such as an ICCID, etc.), which may be equipped on or associated with the user device, to look up an account type associated with the user device.

As shown by reference number 130, once the AAA/HSS has identified the account type for the user device, the AAA/HSS may provide an account type identifier to the user device via the PGW, the MME, and the eNB. One or more other network devices, not shown in FIG. 1, may be involved with returning the account type identifier from the AAA/HSS to the user device. In example implementation 100, assume that the account type identifier is represented by a numerical value of 1, as shown.

As shown by reference number 140, once the user device has received the account type identifier from the AAA/HSS, the user device may use the account type identifier to determine a subset of applications and/or application configurations, stored by the user device, to be enabled or disabled. As shown by reference number 150, the user device may store information regarding applications and/or application configurations for multiple account types.

For example, the user device may store information regarding a first set of applications and application configurations for a first account type, shown as Account Type 1, may store information regarding a second set of applications and application configurations for a second account type, shown as Account Type 2, and may store information regarding a third set of applications and application configurations for a third account type, shown as Account Type 3.

As shown by reference number 160, the user device may enable or disable subsets of applications and/or application configurations based on the account type associated with the user device. For example, based on determining that the user device is associated with an account type identified as Account Type 1, the user device may enable applications associated with Account Type 1, shown as "App 1" and "App 2," and may enable application configurations associated with Account Type 1, shown as "Config A" and "Config B." As further shown, the user device may disable applications and application configurations associated with Account Type 2 and Account Type 3.

In this way, a single user device may enable and disable sets of applications and/or application configurations for any number of account types, thereby increasing user device compatibility. In addition, a single user device may conserve computing resources and reduce testing and development time for user device configurations.

As indicated above, FIG. 1 is provided merely as an example. Other examples are possible and may differ from what was described with regard to FIG. 1.

Figure 2:
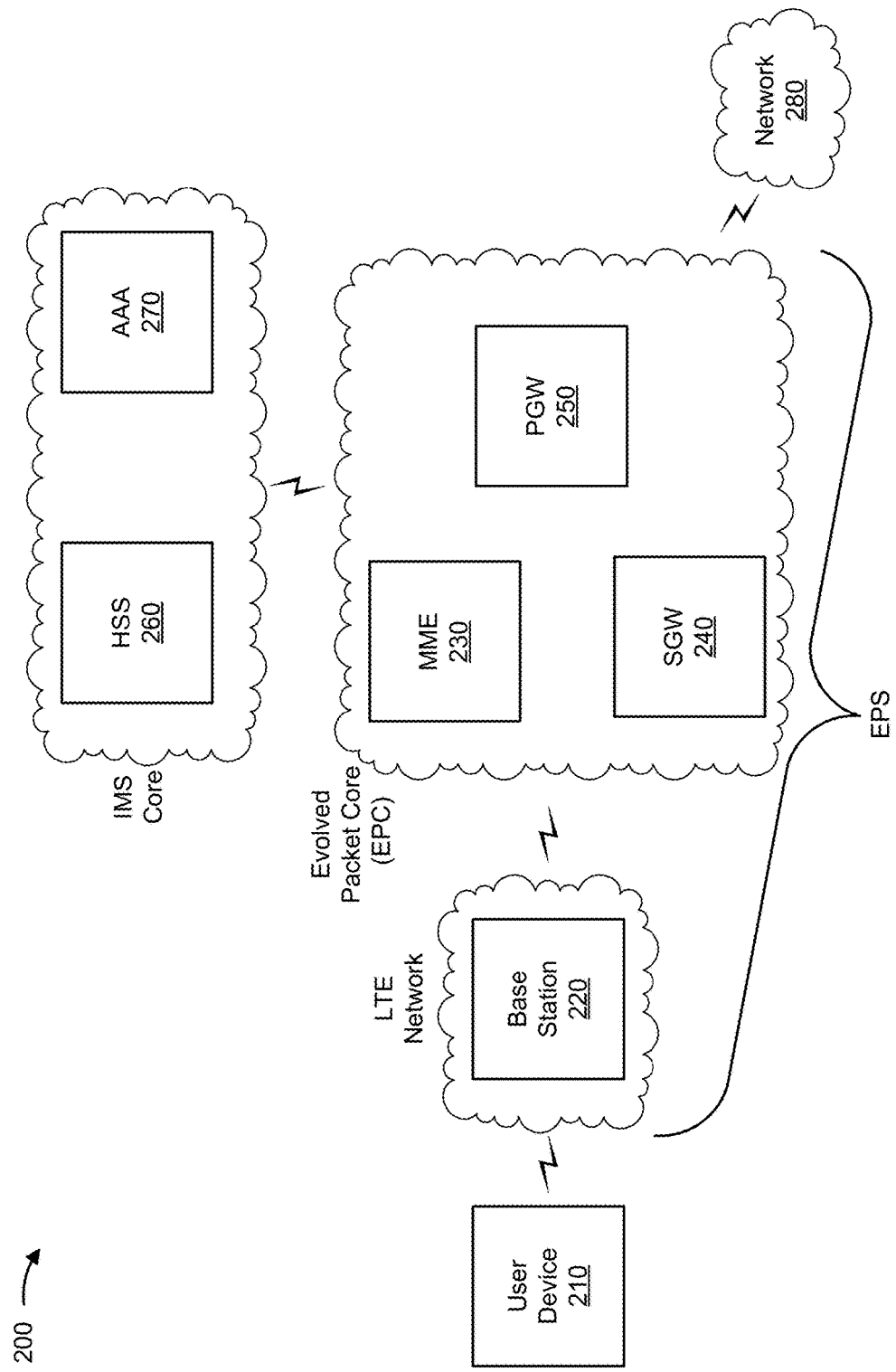
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210; a base station 220; a mobility management entity device (MME) 230; a serving gateway (SGW) 240; a packet data network gateway (PGW) 250; a home subscriber server (HSS) 260; an authentication, authorization, and accounting server (AAA) 270; and a network 280. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 220 that take the form of evolved Node Bs (eNBs) via which user device 210 communicates with the EPC. The EPC may include MME 230, SGW 240, and/or PGW 250 that enable user device 210 to communicate with network 280 and/or an Internet protocol (IP) multimedia subsystem (IMS) core. The IMS core may include HSS 260 and/or AAA 270, and may manage device registration and authentication, session initiation, etc., associated with user devices 210. HSS 260 and/or AAA 270 may reside in the EPC and/or the IMS core.

User device 210 may include one or more devices capable of communicating with base station 220 and/or a network (e.g., network 280). For example, user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a smart wristwatch, a pair of smart eyeglasses, etc.), and/or a similar device. User device 210 may send traffic to and/or receive traffic from network 280 (e.g., via base station 220, SGW 240, and/or PGW 250).

Base station 220 may include one or more devices (e.g., network elements) capable of transferring traffic, such as audio, video, text, and/or other traffic, destined for and/or received from user device 210. In some implementations, base station 220 may include an eNB associated with the LTE network that receives traffic from and/or sends traffic to network 280 via SGW 240 and/or PGW 250. Additionally, or alternatively, one or more base stations 220 may be associated with a RAN that is not associated with the LTE network. Base station 220 may send traffic to and/or receive traffic from user device 210 via an air interface. In some implementations, base station 220 may include a small cell base station, such as a base station of a microcell, a picocell, and/or a femtocell.

MME 230 may include one or more devices (e.g., network elements), such as one or more server devices, capable of managing authentication, activation, deactivation, and/or mobility functions associated with user device 210. In some implementations, MME 230 may perform operations relating to authentication of user device 210. Additionally, or alternatively, MME 230 may facilitate the selection of a particular SGW 240 and/or a particular PGW 250 to serve traffic to and/or from user device 210. MME 230 may perform operations associated with handing off user device 210 from a first base station 220 to a second base station 220 when user device 210 is transitioning from a first cell associated with the first base station 220 to a second cell associated with the second base station 220. Additionally, or alternatively, MME 230 may select another MME (not pictured), to which user device 210 should be handed off (e.g., when user device 210 moves out of range of MME 230).

SGW 240 may include one or more devices (e.g., network elements) capable of routing packets. For example, SGW 240 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 240 may aggregate traffic received from one or more base stations 220 associated with the LTE network, and may send the aggregated traffic to network 280 (e.g., via PGW 250) and/or other network devices associated with the EPC and/or the IMS core. SGW 240 may also receive traffic from network 280 and/or other network devices, and may send the received traffic to user device 210 via base station 220. Additionally, or alternatively, SGW 240 may perform operations associated with handing off user device 210 to and/or from an LTE network.

PGW 250 may include one or more devices (e.g., network elements) capable of providing connectivity for user device 210 to external packet data networks (e.g., other than the depicted EPC and/or LTE network). For example, PGW 250 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 250 may aggregate traffic received from one or more SGWs 240, and may send the aggregated traffic to network 280. Additionally, or alternatively, PGW 250 may receive traffic from network 280, and may send the traffic to user device 210 via SGW 240 and base station 220. PGW 250 may record data usage information (e.g., byte usage), and may provide the data usage information to AAA 270.

HSS 260 may include one or more devices (e.g., network elements), such as one or more server devices, capable of managing (e.g., receiving, generating, storing, processing, and/or providing) information associated with user device 210. For example, HSS 260 may manage subscription information associated with user device 210, such as information that identifies a subscriber profile of a user associated with user device 210, an account type associated with a user of user device 210, information that identifies services and/or applications that are accessible to user device 210, location information associated with user device 210, a network identifier (e.g., a network address) that identifies user device 210, information that identifies a treatment of user device 210 (e.g., quality of service information, a quantity of minutes allowed per time period, a quantity of data consumption allowed per time period, etc.), and/or similar information. HSS 260 may provide this information to one or more other devices of environment 200 to support the operations performed by those devices.

AAA 270 may include one or more devices (e.g., network elements), such as one or more server devices, that perform authentication, authorization, and/or accounting operations for communication sessions associated with user device 210. For example, AAA 270 may perform authentication operations for user device 210 and/or a user of user device 210 (e.g., using one or more credentials), may control access, by user device 210, to a service and/or an application (e.g., based on one or more restrictions, such as time-of-day restrictions, location restrictions, single or multiple access restrictions, read/write restrictions, etc.), may track resources consumed by user device 210 (e.g., a quantity of voice minutes consumed, a quantity of data consumed, etc.), and/or may perform similar operations.

Network 280 may include one or more wired and/or wireless networks. For example, network 280 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
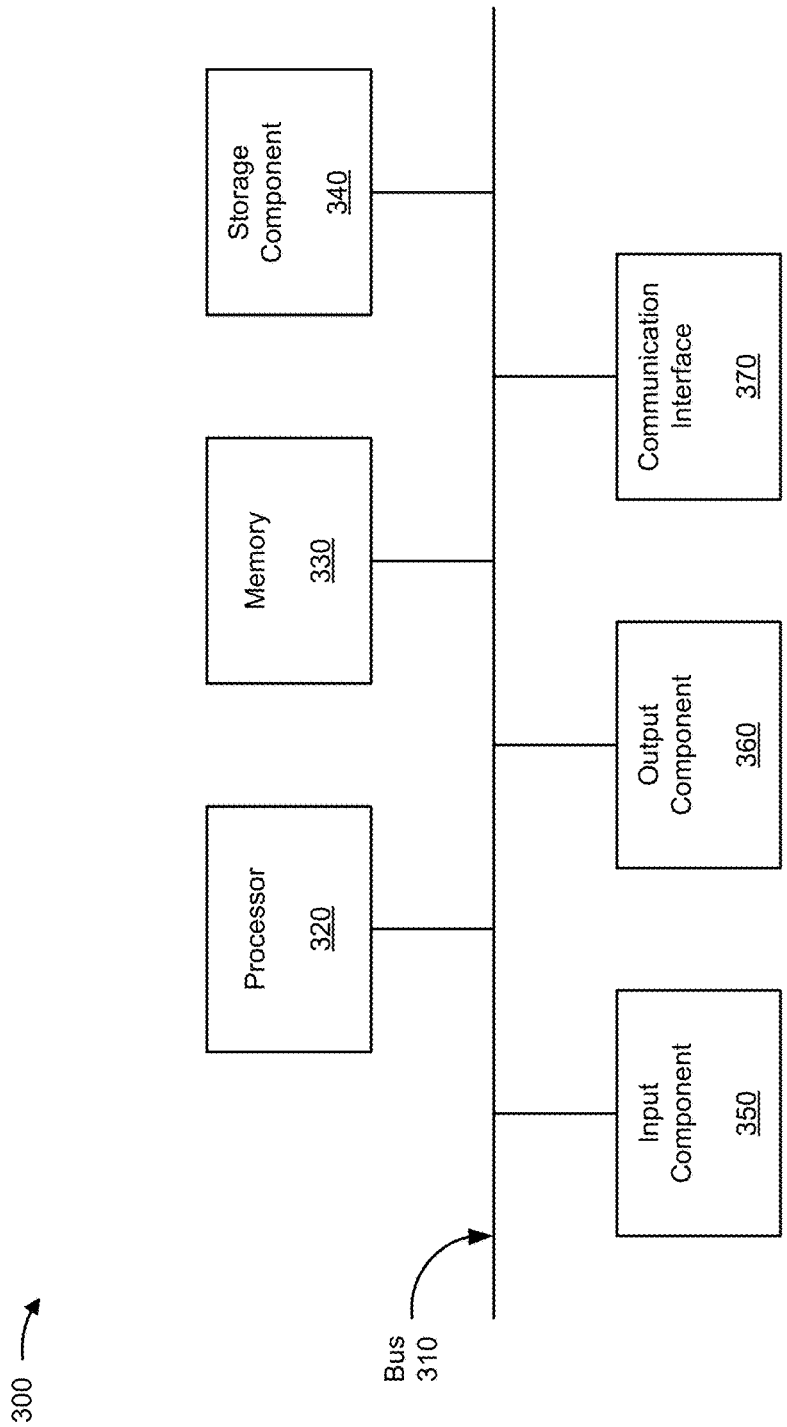
FIG. 3 is a diagram of example components of one or more devices of FIG. 2.

FIG. 3 is a diagram of example components of a device 300. Device 300 may correspond to user device 210, base station 220, MME 230, SGW 240, PGW 250, HSS 260, and/or AAA 270. In some implementations, user device 210, base station 220, MME 230, SGW 240, PGW 250, HSS 260, and/or AAA 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for enabling and disabling user device configurations based on an account type associated with the user device. In some implementations, one or more process blocks of FIG. 4 may be performed by user device 210. In some implementations, one or more process blocks of FIG. 4 may be performed by another device or a group of devices separate from or including user device 210, such as base station 220, MME 230, SGW 240, PGW 250, HSS 260, and/or AAA 270.

As shown in FIG. 4, process 400 may include requesting, by a user device, an account type identifier that identifies an account type associated with the user device (block 410), and receiving the account type identifier (block 420). For example, user device 210 may transmit a request for an account type identifier, and may receive the account type identifier based on the request. The account type identifier may identify an account type associated with user device 210.

In some implementations, the account type identifier may identify an account type associated with a manner in which a user of user device 210 subscribes to (e.g., pays for) one or more telecommunication services (e.g., mobile network services, such as cellular network services, LTE network services, etc.) that a network operator provides (e.g., a mobile network operator, such as a cellular network operator, an LTE network operator, etc.). For example, the account type identifier may indicate whether the user pays the network operator directly (e.g., using a pre-pay account type, a post-pay account type, etc.) or indirectly (e.g., a wholesale account type, where the user pays a virtual mobile network operator (VMNO) directly, and the VMNO licenses radiofrequency spectrum from the network operator, etc.) for telecommunication services.

For example, the account type identifier may indicate whether user device 210 is associated with a pre-pay account type. A pre-pay account type may be an account type where a user pays for telecommunication services directly to a network operator prior to using the telecommunication services (e.g., the user pays to use telecommunication services during a particular month at the beginning of that month, etc.).

As another example, the account type identifier may indicate whether user device 210 is associated with a post-pay account type. A post-pay account type may be an account type where a user contracts with a network operator for telecommunication services to be provided (e.g., at an agreed upon price, for a particular duration, etc.).

As another example, the account type identifier may indicate whether user device 210 is associated with a wholesale account type. A wholesale account type may be an account type where a user pays for telecommunication services indirectly through a third party, rather than paying a network operator directly for the telecommunication services (e.g., the user pays for the telecommunication services indirectly through a VMNO), or another account type.

Additionally, or alternatively, the account type identifier may indicate whether an amount paid by the user satisfies a threshold amount (e.g., whether the user pays an amount more than, less than, or equal to a threshold amount, such as $20 per month, $1,000 per year, etc.), whether the user pays for particular applications and/or services (e.g., voice over long term evolution (VoLTE) services, cloud storage services, mobile hotspot services, etc.), a priority level associated with a user (e.g., whether the user is a preferred customer, whether the user is associated with a high priority status, a medium priority status, or a low priority status, or the like), whether the user has a contract with a network operator, a length of the contract (e.g., a time period during which the contract is valid), a length of time that the user has been a customer of the network operator, an income level or estimated income level of the user, or any other attribute associated with a user account.

In some implementations, the account type identifier may include a value (e.g., a number, a string of characters, etc.) that identifies the account type. Additionally, or alternatively, the account type identifier may be included in a field (e.g., a container) of a 3GPP protocol configuration options (PCO) message (e.g., an operator reserved field, etc.), and may be represented by a value (e.g., a PCO value, such as 1, 2, 3, etc.), which may be stored in the field. For example, a PCO message may include multiple values corresponding to different configuration options, and one or more of the values may identify an account type (e.g., a pre-pay account type, a post-pay account type, a wholesale account type, etc.). Devices of the EPS may use the PCO message to communicate with user device 210 and to deliver the account type identifier to user device 210. User device 210 may store one or more received PCO values.

In some implementations, user device 210 may request the account type identifier when attaching to and/or registering with the EPS. For example, user device 210 may send an attach request and a request for an account type identifier to base station 220. In some implementations, the request for the account type identifier may be included in the attach request. Base station 220 may provide the attach request and/or the request for the account type identifier to HSS 260 (e.g., via SGW 240 and/or PGW 250). HSS 260 may determine an account type identifier based on the request for the account type identifier, and may return the account type identifier to user device 210 (e.g., via PGW 250, SGW 240, and/or base station 220).

In some implementations, HSS 260 may use one or more device identifiers, which identify user device 210, to determine the account type identifier. For example, HSS 260 may search a data structure, using a device identifier, to determine the account type identifier. The device identifier may include, for example, an international mobile equipment identifier (IMEI), an integrated circuit card identifier (IC-CID), a subscriber identity module identifier (SIM ID), an international mobile subscriber identifier (IMSI), a mobile directory number (MDN), or the like. In this case, user device 210 may provide the one or more device identifiers in association with the attach request and/or the request for the account type identifier.

In some implementations, user device 210 may use the account type identifier to determine applications and/or application configurations, stored by user device 210, to be enabled or disabled, as described in more detail below. In this way, a single user device 210 may be compatible with multiple account types, and may flexibly determine applications and/or application configurations to enable or disable based on a particular account type with which user device 210 is associated, which may be determined when user device 210 attaches to the EPS.

As further shown in FIG. 4, process 400 may include comparing the account type and a set of account types corresponding to a set of applications and/or application configurations to be enabled or disabled (block 430). For example, user device 210 may compare the account type, associated with the received account type identifier, with a set of account types corresponding to a set of applications and/or application configurations. In some implementations, user device 210 may store the set of applications and/or application configurations in a memory of user device 210.

Additionally, or alternatively, user device 210 may store information that identifies the set of applications and/or application configurations and/or a set of network locations from which the applications and/or application configurations may be obtained, so that user device 210 may access the set of applications and/or application configurations after determining which applications and/or application configurations to enable or disable, as described in more detail below. In some implementations, a user device configuration may refer to a set of applications, a set of application configurations, or a set of applications and a set of application configurations. Similarly, a user device configuration for an account type may refer to a set of applications and/or application configurations for that account type.

In some implementations, an application may include an executable software program, which user device 210 may store, that performs a set of coordinated functions, tasks, or activities (e.g., an operating system, a web browser application, a media player application, a cloud services application, etc.). An application configuration may include a configuration for an application, such as a user preference, a setting, an application functionality, a user interface design (e.g., an image provided via a user interface, a branding, a logo, a menu, a splash screen, etc.), one or more links that the application provides (e.g., a link to a web portal associated with the network operator, etc.), or other configurable attributes of the application.

In some implementations, an application and/or an application configuration may be associated with an account type. For example, a first account type may be associated with a first set of applications and/or application configurations that is different from a second set of applications and/or application configurations associated with a second account type. Additionally, or alternatively, a first account type and a second account type may be associated with one or more of the same applications and/or application configurations. Additionally, or alternatively, an account type may be associated with only applications or only application configurations. For example, a first account type may be associated with one or more applications and no application configurations, and a second account type may be associated with one or more application configurations and no applications.

In some implementations, user device 210 may store the set of applications and/or application configurations in association with information that identifies the set of corresponding account types (e.g., a set of corresponding account type identifiers). Additionally, or alternatively, user device 210 may store information that identifies the set of applications and/or application configurations (e.g., using application identifier(s) and/or application configuration identifier(s)) in association with information that identifies the set of corresponding account types. Additionally, or alternatively, user device 210 may store information that identifies a set of network locations, from which the set of applications and/or application configurations are accessible, in association with information that identifies the set of corresponding account types.

In some implementations, a set of applications and/or application configurations and corresponding account types may be pre-determined. For example, user device 210 may be configured to store the set of applications and/or application configurations as a factory setting. Additionally, or alternatively, user device 210 may receive a set of applications and/or application configurations and corresponding account types (e.g., from base station 220). Additionally, or alternatively, user device 210 may update or modify information that identifies an account type for an application and/or an application configuration (e.g., over time, as updated information is received from base station 220, etc.). In some implementations, user device 210 may store information that identifies an account type associated with an application and/or an application configuration based on input received via an application programming interface (API).

In some implementations, user device 210 may compare the received application type identifier with application type identifiers associated with stored applications and/or application configurations to determine which set of applications and/or application configurations to enable or disable on user device 210, as described in more detail below. Additionally, or alternatively, user device 210 may determine an account type associated with the received account type identifier, and may use the account type to determine which set of applications and/or application configurations to enable or disable on user device 210, as described in more detail below.

In this way, by comparing the account type and a set of account types corresponding to a set of applications and/or application configurations, user device 210 may reduce complexity associated with developing and maintaining separate software configurations for different user devices 210, may conserve resources associated with configuration and testing of the different user device configurations, and may increase compatibility of user device 210.

As further shown in FIG. 4, process 400 may include enabling a first subset of applications and/or application configurations, associated with the account type, based on the comparison (block 440). For example, user device 210 may enable a subset of applications and/or application configurations, from a total set of applications and/or application configurations, based on comparing an account type associated with user device 210 and account types associated with the total set of applications and/or application configurations. In some implementations, user device 210 may enable an application and/or an application configuration if the comparison indicates a match between an account type of an application and/or application configuration and an account type associated with user device 210 (e.g., a match between account types, a match between account type identifiers, etc.).

In some implementations, user device 210 may enable an application by installing the application on user device 210. Additionally, or alternatively, user device 210 may enable an application by permitting the application to be executed on user device 210. Additionally, or alternatively, user device 210 may enable an application by displaying a shortcut, to launch the application, on a user interface of user device 210. Additionally, or alternatively, user device 210 may enable an application by downloading the application (e.g., when user device 210 does not store the application, but stores information that identifies a network location from which user device 210 can download the application) and/or installing the downloaded application.

In some implementations, user device 210 may enable an application configuration by activating the application configuration (e.g., by configuring an application using the application configuration). For example, user device 210 may enable a user preference for an application, may enable a setting for an application, may enable an application functionality, may enable a user interface design (e.g., an image provided via a user interface, a branding, a logo, a menu, a splash screen, etc.), may enable one or more links that the application provides (e.g., a link to a web portal associated with the network operator, etc.), or the like.

As an example, assume that the account type associated with user device 210 is a direct pay account type, where a user of user device 210 pays a network operator directly (e.g., a pre-pay account type, a post-pay account type, etc.). In this case, user device 210 may enable a subset of applications and/or application configurations associated with the direct pay account type. For example, user device 210 may enable applications that the network operator provides (e.g., a network operator cloud service application, a network operator bill payment application, a network operator account information/settings application, etc.). Additionally, or alternatively, user device 210 may enable network operator branding (e.g., a network operator logo on the home screen, boot screen, etc.) associated with the network operator, or may enable other application configurations that the network operator provides.

As another example, assume that the account type associated with user device 210 is an indirect pay account type, where a user of user device 210 pays a virtual mobile network operator (e.g., a wholesale account type, etc.). In this case, user device 210 may enable a subset of applications and/or application configurations associated with the indirect pay account type. For example, user device 210 may enable a VMNO application (e.g., a VMNO bill payment application, a VMNO account information/settings application, etc.). Additionally, or alternatively, user device 210 may enable VMNO branding (e.g., a VMNO logo on the home screen, boot screen, etc.) associated with the VMNO, or may enable other application configurations associated with the VMNO.

In some implementations, an application and/or an application configuration may not be associated with an account type identifier. In this case, user device 210 may enable these applications and/or application configurations by default, so that user device 210 is compatible with applications and/or application configurations that are not associated with an account type identifier. However, in some implementations, user device 210 may disable these applications and/or application configurations by default. In this way, a compatibility of user device 210 may be increased.

As further shown in FIG. 4, process 400 may include disabling a second subset of applications and/or application configurations, associated with another account type, based on the comparison (block 450). For example, user device 210 may disable a subset of applications and/or application configurations, from a total set of applications and/or application configurations, based on comparing an account type associated with user device 210 and account types associated with the total set of applications and/or application configurations. In some implementations, user device 210 may disable an application and/or an application configuration if the comparison indicates a mismatch between an account type of the application and/or application configuration and an account type associated with user device 210 (e.g., a mismatch between account types, a mismatch between account type identifiers, etc.).

In some implementations, user device 210 may disable an application by not installing, or by uninstalling, the application on user device 210. Additionally, or alternatively, user device 210 may disable an application by not permitting the application to be executed on user device 210. Additionally, or alternatively, user device 210 may disable an application by removing, or by not displaying, a shortcut, to launch the application, on a user interface of user device 210. Additionally, or alternatively, user device 210 may disable an application by not downloading the application (e.g., when user device 210 does not store the application, but stores information that identifies a network location from which user device 210 can download the application) and/or not installing the downloaded application.

In some implementations, user device 210 may disable an application configuration by not activating the application configuration (e.g., by not configuring the application with the application configuration). For example, user device 210 may disable a user preference for an application, may disable a setting for an application, may disable an application functionality, may disable a user interface design (e.g., an image provided via a user interface, a branding, a logo, a menu, a splash screen, etc.), may disable one or more links that the application provides (e.g., a link to a web portal associated with the network operator, etc.), or the like.

As an example, assume that the account type associated with user device 210 is an indirect pay account type, where a user of user device 210 pays a virtual mobile network operator indirectly (e.g., a wholesale account type, etc.). In this case, user device 210 may disable a subset of applications and/or application configurations associated with the indirect pay account type. For example, user device 210 may disable applications that the network operator provides (e.g., a network operator cloud service application, a network operator bill payment application, a network operator account information/settings application, etc.). Additionally, or alternatively, user device 210 may disable network operator branding (e.g., a network operator logo on the home screen, boot screen, etc.) associated with the network operator, or may disable other application configurations that the network operator provides. In this way, a compatibility of user device 210 may be increased.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may reduce or eliminate the requirement to separately configure a user device for each possible account type. Instead, the user device may store and/or have access to multiple user device configurations for multiple account types, and may enable and disable the appropriate applications and application configurations based on the account type of the user device. This may reduce processing resources needed for separate development, testing, compliance, certification, etc. for separate user device configurations. In addition, this may increase flexibility and compatibility by permitting a single user device to change account types and to be compatible with different account types (e.g., thereby reducing computing errors and/or other errors related to changing account types).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
a memory; and
one or more processors to:
    transmit, to a base station, a request for an account type identifier that identifies an account type associated with a subscription of the user device to one or more telecommunication services,
        the account type identifier being included in a field of a 3GPP protocol configuration operations message, and
        the account type indicating a manner in which a user of the user device subscribes to the one or more telecommunication services;
    receive the account type identifier in the 3GPP protocol configuration operations message from the base station;
    compare the account type identifier and a set of account type identifiers corresponding to a set of user device configurations to be enabled or disabled based on the account type identifier;
    enable, based on comparing the account type identifier and the set of account type identifiers, a first subset of user device configurations, included in the set of user device configurations, associated with the account type identified by the account type identifier,
        where the one or more processors, when enabling the first subset of user device configurations, are to:
            install one or more applications, associated with the first subset of user device configurations, on the user device, and
            enable a user interface design associated with the one or more applications; and
    disable, based on comparing the account type identifier and the set of account type identifiers, a second subset of user device configurations, included in the set of user device configurations, associated with another account type different than the account type identified by the account type identifier,
        the second subset of user device configurations being different from the first subset of user device configurations.

2. The user device of claim 1, where the account type includes at least one of:
    a pre-pay account type that indicates that the user pays for the one or more telecommunication services directly to a network operator prior to using the one or more telecommunication services,
    a post-pay account type that indicates that the user contracts with the network operator for the one or more telecommunication services, or
    a wholesale account type that indicates that the user pays for telecommunication services indirectly to the network operator via a third party, rather than paying the network operator directly for the one or more telecommunication services.

3. The user device of claim 1, where the set of user device configurations is associated with a set of application configurations.

4. The user device of claim 3, where the set of application configurations includes at least one of:
    a preference associated with an application, or
    a setting associated with the application.

5. A non-transitory computer-readable medium storing instructions, the instructions comprising:
one or more instructions that, when executed by one or more processors of a user device, cause the one or more processors to:
    request an account type value that identifies an account type associated with the user device,
        the account type value being included in a field of a 3GPP protocol configuration operations message, and
        the account type value being associated with a subscription of the user device to a network;
    receive the account type value in the 3GPP protocol configuration operations message;
    compare the account type value and a set of account type values corresponding to a set of applications or application configurations to be enabled or disabled by the user device based on the account type value,
        the user device storing at least one of:
            the set of applications or application configurations, or
            information that identifies the set of applications or application configurations;
    enable, based on the comparison, a first subset of applications or application configurations, included in the set of applications or application configurations, associated with the account type value,
where the one or more instructions, that cause the one or more processors to enable the first subset of applications or application configurations, cause the one or more processors to:
install the first subset of applications or application configurations on the user device, and
enable a user interface design associated with activation of the first subset of the applications or application configurations; and
disable, based on the comparison, a second subset of applications or application configurations, included in the set of applications or application configurations, associated with another account type value other than the account type value.

6. The non-transitory computer-readable medium of claim 5, where the one or more instructions, that cause the one or more processors to request the account type value, cause the one or more processors to:
request the account type value in association with a request to attach to the network; and
where the one or more instructions, that cause the one or more processors to receive the account type value, cause the one or more processors to:
receive the account type value from a base station based on a response to the request to attach to the network.

7. The non-transitory computer-readable medium of claim 5, where the one or more instructions, that cause the one or more processors to enable the first subset of applications or application configurations, cause the one or more processors to:
activate the first subset of applications or application configurations.

8. The non-transitory computer-readable medium of claim 5, where the one or more instructions, that cause the one or more processors to enable the first subset of applications or application configurations, cause the one or more processors to:
present, for display, a shortcut for an application included in the first subset of applications or application configurations.

9. The non-transitory computer-readable medium of claim 5, where the one or more instructions, that cause the one or more processors to enable the first subset of applications or application configurations, cause the one or more processors to:
download an application included in the first subset of applications or application configurations.

10. The non-transitory computer-readable medium of claim 5, where the one or more instructions, that cause the one or more processors to disable the second subset of applications or application configurations, cause the one or more processors to:
prevent the second subset of applications or application configurations from being installed, downloaded, or executed.

11. A method, comprising:
requesting, by a user device, an account type identifier that identifies an account type associated with the user device,
the account type identifier being included in a field of a 3GPP protocol configuration operations message, and
the account type identifier indicating a manner in which a user of the user device pays for one or more telecommunication services;
receiving, by the user device, the account type identifier in the 3GPP protocol configuration operations message based on requesting the account type identifier;
comparing, by the user device, the account type identifier and a set of account type identifiers corresponding to a set of user device configurations to be enabled or disabled by the user device based on the account type identifier,
the set of user device configurations being stored by the user device;
enabling, by the user device and based on the comparison, a first subset of user device configurations, included in the set of user device configurations, that are associated with the account type identifier,
where enabling the first subset of user device configurations comprises:
installing one or more applications, associated with the first subset of user device configurations, on the user device, and
enabling a user interface design associated with the one or more applications; and
disabling, by the user device and based on the comparison, a second subset of user device configurations, included in the set of user device configurations, that are not associated with the account type identifier.

12. The method of claim 11, where disabling the second subset of user device configurations comprises:
preventing the second subset of user device configurations from being installed, downloaded, or executed.

13. The method of claim 11, where requesting the account type identifier comprises:
requesting the account type identifier in association with a request to attach to a network; and
where receiving the account type identifier comprises:
receiving the account type identifier from a base station based on a response to the request to attach to the network.

14. The method of claim 11, where the set of user device configurations includes at least one of:
a set of applications stored by the user device, or
a set of application configurations stored by the user device.

15. The method of claim 11, where the set of account type identifiers is stored by the user device in association with the set of user device configurations.

16. The user device of claim 1, where the one or more processors, when enabling the first subset of user device configurations, are to:
enable an application, of the one or more applications, by displaying a shortcut in order to launch the application on a user interface of the user device.

17. The non-transitory computer-readable medium of claim 5, where the one or more instructions, that cause the one or more processors to enable the first subset of applications or application configurations, cause the one or more processors to:
enable an application, of the one or more applications, by displaying a shortcut in order to launch the application on a user interface of the user device.

18. The method of claim 11, where enabling the first subset of user device configurations, comprises:
enabling an application, of the one or more applications, by displaying a shortcut in order to launch the application on a user interface of the user device.

19. The user device of claim 1, where the one or more processors, when enabling the first subset of user device configurations, are to:
  download one or more applications associated with the first subset of user device configurations.

20. The user device of claim 1, where the one or more processors, when disabling the second subset of user device configurations, are to:
  prevent the second subset of user device configurations from being installed, downloaded, or executed.

\* \* \* \* \*